(No Model.) 3 Sheets—Sheet 1.
S. F. VAN CHOATE.
ARMATURE FOR DYNAMO ELECTRIC MACHINES AND ELECTRIC MOTORS.
No. 325,714. Patented Sept. 8, 1885.
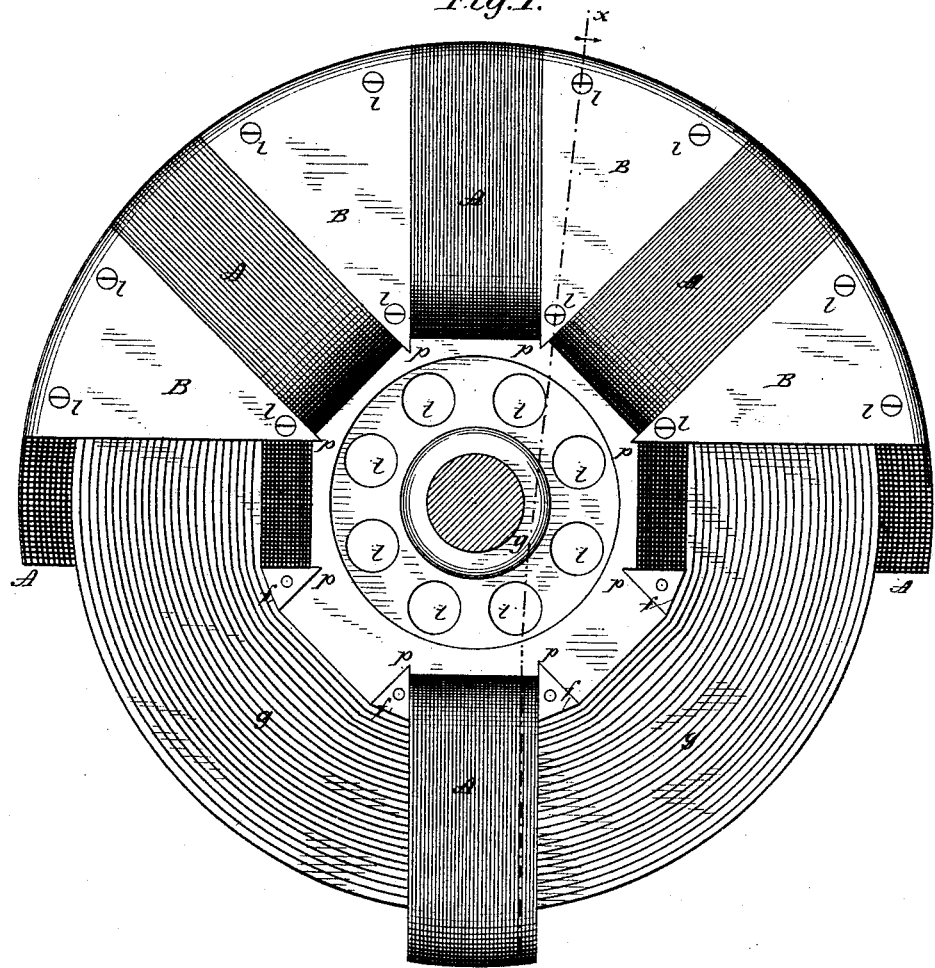
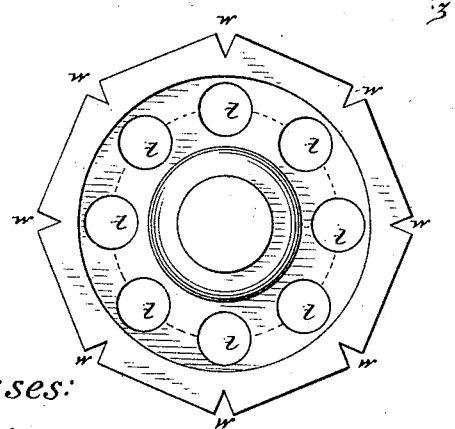
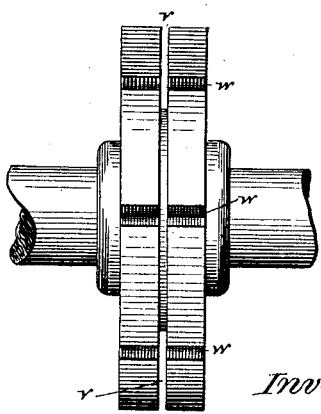
Witnesses:
Ernest Abshagen
Thos. Toomey
Inventor:
S. F. Van Choate
By his Attorney:

(No Model.) 3 Sheets—Sheet 2.
S. F. VAN CHOATE.
ARMATURE FOR DYNAMO ELECTRIC MACHINES AND ELECTRIC MOTORS.
No. 325,714. Patented Sept. 8, 1885.
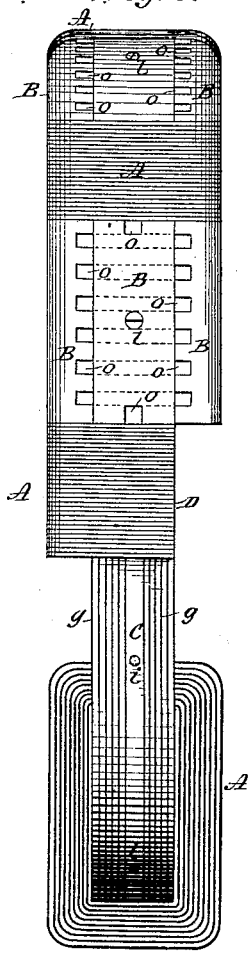
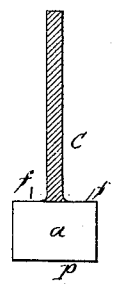
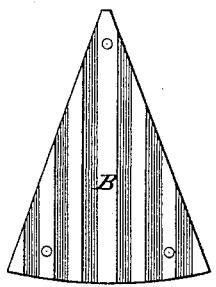
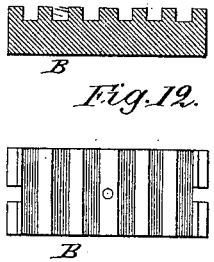
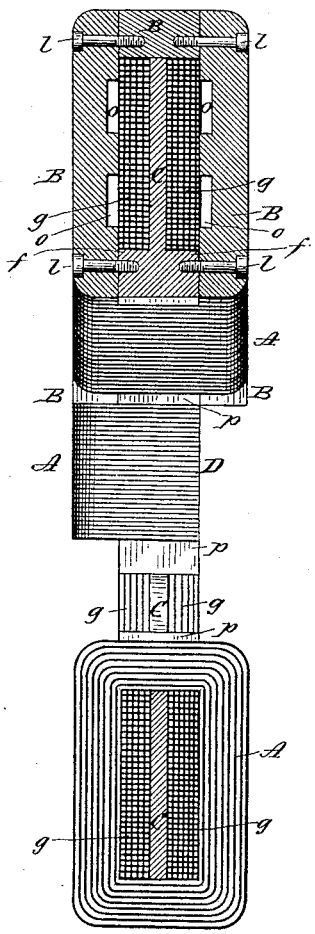
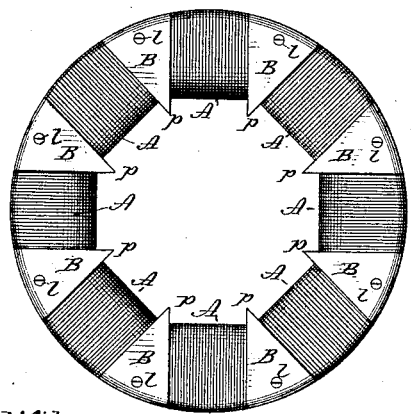
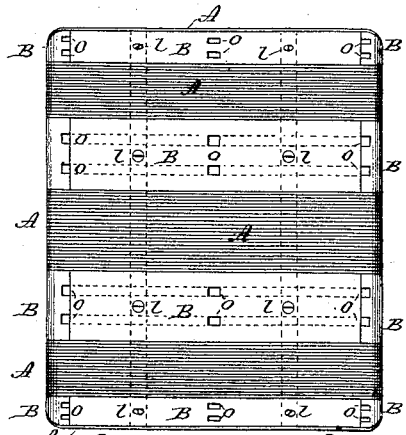
Witnesses:
Ernest Abshagen
Thos. Toomey
Inventor:
S. F. Van Choate
By his Attorney: H. C. Townsend
N. PETERS, Photo-Lithographer, Washington, D. C.

(No Model.) 3 Sheets—Sheet 3.
S. F. VAN CHOATE.
ARMATURE FOR DYNAMO ELECTRIC MACHINES AND ELECTRIC MOTORS.
No. 325,714. Patented Sept. 8, 1885.
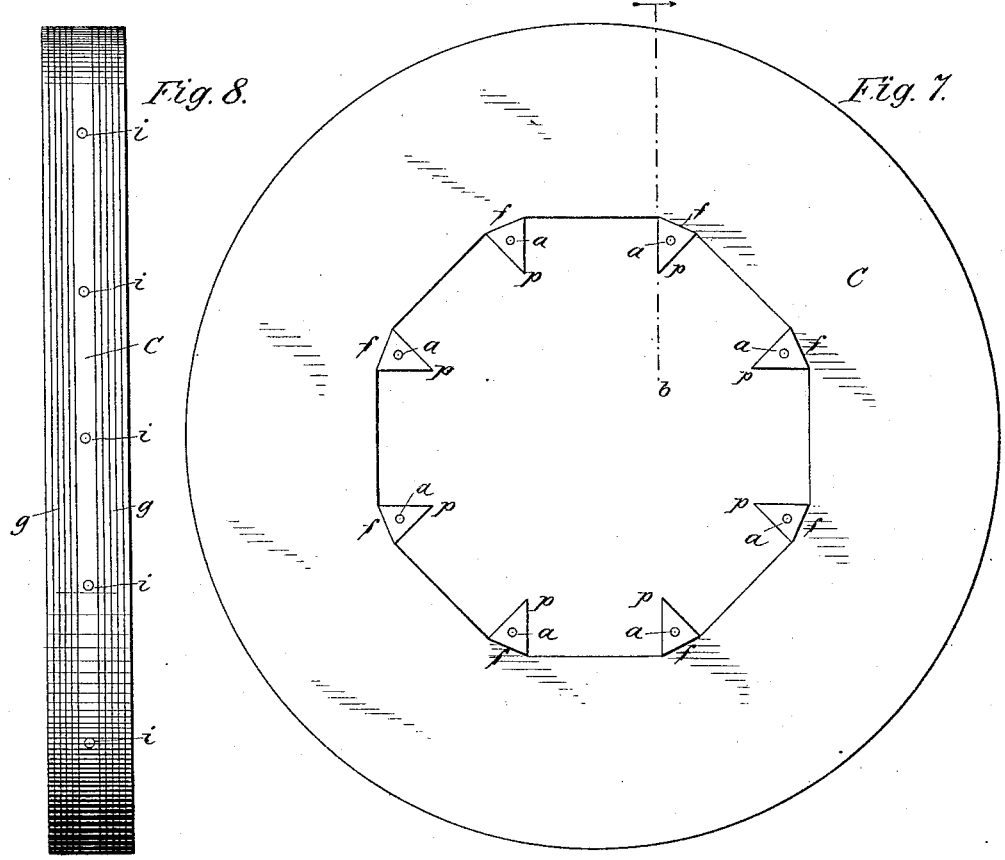
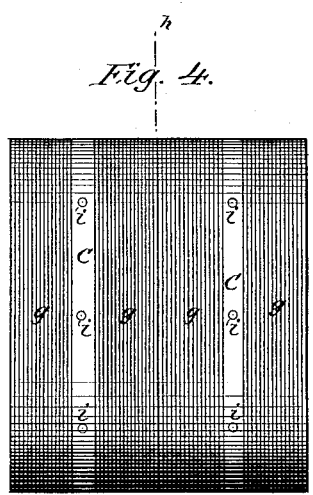
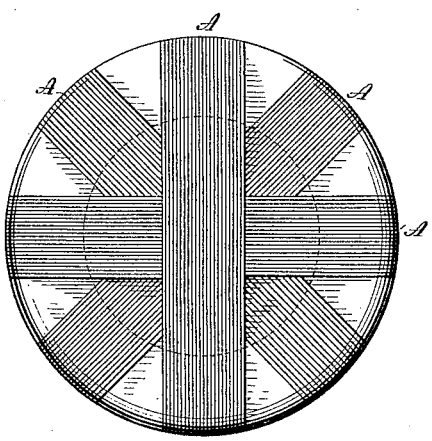
Witnesses:
Ernest Abshagen
Thos. Toomey
Inventor:
S. F. Van Choate
By his Attorney: H. C. Townsend

UNITED STATES PATENT OFFICE.

SYLVANUS F. VAN CHOATE, OF NEW YORK, N. Y.

ARMATURE FOR DYNAMO-ELECTRIC MACHINES AND ELECTRIC MOTORS.

SPECIFICATION forming part of Letters Patent No. 325,714, dated September 8, 1885.

Application filed December 23, 1884. (No model.)

*To all whom it may concern:*

Be it known that I, SYLVANUS F. VAN CHOATE, of the city, county, and State of New York, a citizen of the United States, now residing in Boston, Massachusetts, have invented certain new and useful Improvements in Armatures for Dynamo-Electric Machines and Motors, of which the following is a specification.

My invention relates to the mechanical construction of armatures for dynamo-electric machines and motors, and is more especially designed to provide a simple and effective means for preventing the formation and circulation of neutralizing-currents, or the so-called "Foucault" currents, in the frame or body of the armature, to aid in keeping the armature cool when under the influence of induced currents, and to prevent any humming noise in a machine when it is in operation.

To this end my invention consists in the novel construction hereinafter described and claimed.

In the accompanying drawings, Figures 1 and 2 represent armatures constructed in accordance with my invention, Fig. 1 indicating, in side view, an armature of the ring type, and Fig. 2, in plan, that of the drum and cylinder types. Figs. 3 and 4 are details of Fig. 2; and Figs. 5, 6, 7, 8, 9, 10, 11, 12, 13, and 16 are details of Fig. 1. Figs. 14 and 15 are respectively side and edge views of the hub or support on which the armature is held.

In Fig. 1 is shown an armature partly in plan and partly in section. The coils or helices of copper wire in this figure, as well as all of said coils in all the figures, are indicated by the letter A, while the letter B represents wood or other non-magnetic material, which fills the spaces between the edges or sides and ends of the coils.

Fig. 7 represents a spine or frame, (marked C.) This is the foundation or backbone of the armature, and consists of a thin flat disk, wheel, or plate of cast or soft iron or other magnetic material, carrying upon its inside periphery or edge spikes or projections (marked $a$) which serve to hold the spine to the hub of the shaft, and also to form interior end slots for the coils of copper wire and to serve as abutments or supports upon which are to be wound or placed lateral or transverse coils of soft-iron wire to finish out the core or frame of the armature, in the manner more fully described further on.

Fig. 9 is a section of the spine C, taken on a line marked $b$ $b$, Fig. 7, and shows the thin edge of the spine and the wedge-shaped tooth or projection $a$ at the bottom. It will be seen that the projection $a$, Fig. 9, forms two shoulders or abutments, $f$ $f$—one on either side of the disk or spine C. These shoulders or abutments are again represented at $f$ in Fig. 7. They are integral with and form a part of the lateral spine or disk C. On each side of the disk or spine C, and upon the abutments or projections $f$, are wound or placed a coil or coils of uninsulated soft-iron wire, as indicated by the letter $g$, and shown partly in section in Fig. 6, and partly in plan in Figs. 4, 5, 6, and 8, and partly in side or flat surface in Fig. 1. The size of the iron wire for the spinal coils or disks is determined by the width of the abutments or shoulders and the relative size of the armature desired. Whatever size of wire and number of layers there may be, it is desirable to have them exactly fill the shoulders laterally to a smooth flush surface with the outer edge of the face of the projections and shoulders $f$, and to extend upward on the sides of the spine C to the top or outer edge thereof. The calculation for this is easy. If the lateral projection of the shoulder or abutment is, say, one-half inch wide, then five wires of a diameter of one-tenth inch each will make an exact flush surface at the sides; and if the spine C is, say, two inches high or broad, then it would require twenty layers of the same wire to cover the surface of the spine to a flush line at the top or exterior periphery. In this case we would have two thin flat disks of uninsulated wire a half inch thick by two inches broad. These iron-wire coils may be wound directly upon the spine C, or they may be wound upon a cast-iron or other former and afterward placed in position upon the spine. The latter is the mode I prefer, and I also prefer to have each lateral wire or layer in one piece, although the whole coil may be made of one continuous wire. When the spinal coil of iron wire is formed or wound, the ends of the wire may be secured by soldering, brazing, or by screws, rivets, or bolts. The mass of wire may be also held firmly together as a coil by soldering or brazing in places. These coils thus become almost like solid rings or wheels, and can be handled with ease and facility. To free the iron wire as well as the spine from the effects of the acid or flux used in soldering or brazing, the coils may be boiled, and, if need be, the spine and coils together, in oil or other substance to prevent rusting.

Fig. 8 represents a plan, looking down on top of the core, of a ring-armature constructed in accordance with my invention; and Fig. 4 shows a similar view of the core of a drum or cylinder armature, C being the spine, and $g$ the coil of iron wire.

In Fig. 4 two rings or spines are placed together endwise to give length to the cylinder, the connecting-line between them being shown by the letters $h$ $h$. As many of these spines and coils may be used as required to give the length to the drum or cylinder; or a long cylinder may be formed without the projecting spines and the iron wire wound directly upon it, or formed into coils and placed upon the cylinder. I prefer the arrangement of the spines, because, for one reason, the edge of the spine furnishes a solid iron base or foundation for screws or bolts to hold in place the wooden or other strips which separate the transverse coils of copper wire, which screws or bolts enter the holes marked in Figs. 4, 5, and 8. In this respect the peripheral edges of the spines are of considerable importance, as they furnish a means of securely building up and fastening the parts of the armature in a symmetrical and substantial manner, which could not be done if screws or bolts had to be placed in the iron wires forming the spinal iron coils.

Returning to Fig. 1, there are four copper-wire coils shown in elevation—three at the top and one at the bottom—all marked with the letter A, while on the right and left hand sides are two coils, shown partly in section, being cut through on a line flush with the right-hand face of the iron coil, as shown at D in Figs. 5 and 6. The upper end or part of the lower coil in Fig. 1 is shown held and bounded by the projecting points or abutments $f$ on either side, the balance of the sides of the coil being disencumbered of its supports or flanges. The three upper coils and the two sectional coils at either side are separated from each other by V-shaped plates of wood (marked B.) There are also wooden plates, also marked B, separating the coils at the outer periphery of the armature and connecting with ends of the other wooden plates, as shown in Figs. 2, 3, 5, and 6. For armatures in dynamo-machines, or machines to generate a current of electricity, I prefer to make these plates B of wood, although they may be made of any suitable non-magnetic material, and it must be particularly non-magnetic; but for armatures for motors these plates B are to be replaced by soft or cast iron—that is, the space which would be filled up with wood or other non-magnetic material for generators would be filed up with iron or other magnetic material in an armature designed for a motor. I desire that this difference in the two kinds of material should be distinctly noted. The plates B are formed in size and shape so as to exactly fill to a flush line or surface the exterior or outside surfaces of the copper-wire coils of the armature. They are held in place by rivets or screws (marked $l$ in Figs. 1, 2, 3, 5, and 6.) These plates are grooved and slotted, as shown in Figs. 1, 2, 3, 5, and 6, and more in detail in Fig. 10, 11, 12, and 13. These grooves or slots are directly in connection with the outside surface of the iron wire or iron core of the armature, and openings or cavities are provided, as indicated at $o$ in Figs. 2 and 5. The object of these grooves, cavities, and openings is to relieve the iron from the contact of the wood as much as possible, to prevent the heating of the iron, and to furnish an outlet for the heat when formed. These grooves or cavities may be entirely dispensed with, if desired. The prime importance of the wooden or other plate is to form continuous and flush surfaces with and between the coils of copper wire to prevent the noise or hum of an armature while in motion, besides forming flanges or abutments to secure the sides and ends of the wire coils. When the plates shown in Figs. 10, 11, 12, and 13 are properly arranged together, they complete the contour or finish of the armatures, as shown in Figs. 1, 2, 3, 5, 6, Fig. 5 being a perpendicular view of Fig. 1, and Fig. 6 a sectional view of Fig. 1, taken on the line $x$ $y$ $z$, with the part Fig. 5 taken away.

In Fig. 6 are shown the screws $l$, which hold the plates B, the two upper screwing into the joining wooden plates and the two lower screwing into the iron shoulders or abutments $f$. The grooves $o$ shown in section at the sides of the iron wire at the upper part of Fig. 6 are elongated, owing to the diagonal direction of the sectional cut. The interior points or teeth of the spine (marked $p$ in Figs. 1, 3, 6, 7, and 9,) are for the purpose of securing the armature to the hub and shaft.

Fig. 14 is an end view of the hub, and Fig. 15 is a plan of it, looking down perpendicularly upon its edge or rim. Holes or openings (marked $t$) are formed through the web of the hub for ventilation and to reduce the weight. A deep slot or groove (marked $v$) is formed around the periphery, which extends through the rim and into the openings or holes $t$, so the air can circulate through them freely. At each angle or point of meeting of the octagonal faces upon the periphery is cut a V-shaped groove (marked $w$) which extends across the face or edge of the hub. The teeth or projections $p$ fit exactly in these V-shaped slots, and serve to rotate the armature with the hub. The iron-wire spinal coil is partly shown in elevation or side view in the lower half of Fig. 1, and the edge of the iron-wire spinal coils are partly shown at $g\,g$ in Figs. 4, 5, 6, and 8, with the edge of the spine C between them.

Fig. 4 represents the spinal frame of a drum-armature before it is placed upon the hub or shaft, and before the wooden plates B are fitted, and before the coils of copper wire are wound upon it; and Fig. 2 shows the same after the wooden plates and copper-wire coils have been fitted in place.

Fig. 16 shows an end view of a cylinder-armature built up and formed upon the same plan. In this figure the crossings of the copper-wire coils at the ends of the cylinder are shown, the other details being substantially the same as shown in Figs. 2 and 4.

It will be observed that an armature formed in accordance with the foregoing description presents a smooth, even peripheral surface, and that by substituting wood for metal between the coils the weight is greatly reduced, the magnetic pull upon the jaws of the field-magnets is reduced, and by the smoothness and evenness of the exterior surface all noise and humming is prevented. The grooving in the wooden plates ventilates the spinal coils of iron wire, and the particular formation of the spine and the spinal coils combined, as described, prevent the circulation of so-called "Foucault current," and consequently heating of the combined armature is prevented.

What I claim as my invention is—

1. The combination of spine C and spinal coils of iron wire $g$, as and for the purposes stated.

2. The combination of the wooden or non-magnetic plates B and the coils or helices A, the wooden or non-magnetic plates being located between the coils or helices, as described and shown, and for the purposes stated.

3. The combination of the hub and spinal frame having projecting points or teeth, the latter fitting into the grooves or slots of the former, as shown and described.

4. The combination, in an armature, of the coils or helices and the non-magnetic material between said coils or helices, and forming a smooth, even exterior surface, as shown and described, and for the purpose stated.

Signed at New York, in the county of New York and State of New York, this 20th day of December, A. D. 1884.

SYLVANUS F. VAN CHOATE.

Witnesses:
 THOS. TOOMEY,
 WM. H. BLAIN.